United States Patent
Kimura

(10) Patent No.: US 8,422,039 B2
(45) Date of Patent: Apr. 16, 2013

(54) IMAGE FORMING APPARATUS FOR PRINTING AN OBJECT AND INFORMATION PROCESSING METHOD THEREFOR

(75) Inventor: Hiroyuki Kimura, Kawasaki (JP)

(73) Assignee: Canon Kabushiki Kaisha (JP)

( * ) Notice: Subject to any disclaimer, the term of this patent is extended or adjusted under 35 U.S.C. 154(b) by 937 days.

(21) Appl. No.: 11/685,996

(22) Filed: Mar. 14, 2007

(65) Prior Publication Data

US 2007/0229885 A1   Oct. 4, 2007

(30) Foreign Application Priority Data

Mar. 30, 2006   (JP) .................................. 2006-095842

(51) Int. Cl.
*G06F 3/12*   (2006.01)

(52) U.S. Cl.
USPC ......... 358/1.13; 358/1.14; 358/1.15; 709/203

(58) Field of Classification Search .................. 358/1.13, 358/1.14, 1.15; 709/203
See application file for complete search history.

(56) References Cited

U.S. PATENT DOCUMENTS

| | | | |
|---|---|---|---|
| 6,055,530 A | 4/2000 | Sato | |
| 7,493,491 B2 | 2/2009 | Ootsuka et al. | |
| 2002/0114002 A1* | 8/2002 | Mitsubori et al. | 358/1.15 |
| 2003/0061166 A1 | 3/2003 | Saito et al. | |
| 2003/0123079 A1* | 7/2003 | Yamaguchi et al. | 358/1.15 |
| 2003/0182190 A1* | 9/2003 | Bergerioux | 705/14 |
| 2004/0133636 A1* | 7/2004 | Kinoshita et al. | 709/203 |
| 2005/0219607 A1* | 10/2005 | Yamaguchi et al. | 358/1.15 |
| 2006/0023247 A1* | 2/2006 | Yamakawa | 358/1.14 |
| 2006/0028669 A1* | 2/2006 | Kumagai | 358/1.13 |
| 2006/0037055 A1 | 2/2006 | Hashimoto et al. | |
| 2006/0050290 A1* | 3/2006 | Kondo | 358/1.13 |
| 2006/0056873 A1* | 3/2006 | Kimura | 399/81 |
| 2006/0120616 A1 | 6/2006 | Kita | |
| 2006/0256375 A1 | 11/2006 | Abe | |
| 2007/0240228 A1 | 10/2007 | Kimura | |

FOREIGN PATENT DOCUMENTS

| | | |
|---|---|---|
| JP | 2000-285054 A | 10/2000 |
| JP | 2001-243031 A | 9/2001 |
| JP | 2001-325249 A | 11/2001 |
| JP | 2003-48361 A | 2/2003 |

(Continued)

OTHER PUBLICATIONS

Office Action issued in corresponding application CN200710089812.8, dated Dec. 5, 2008.

(Continued)

*Primary Examiner* — Jacky X Zheng
(74) *Attorney, Agent, or Firm* — Rossi, Kimms & McDowell LLP

(57) ABSTRACT

An object of the invention is to simplify the setting of a printing condition when printing an object displayed by a browser. The invention is an information processing method in an image forming apparatus capable of printing an object displayed by a browser that includes the steps of searching, if a printing instruction is input, storage unit in which a printing condition of an object when printed is stored in association with a storage location of the object (step S702), reading a printing condition corresponding to a storage location of an object being displayed when the printing instruction was input, based on a result of the search in step S702 (step S703), and printing the object being displayed, based on the printing condition read in step S703 (steps S704, S705).

6 Claims, 15 Drawing Sheets

FOREIGN PATENT DOCUMENTS

| | | | |
|---|---|---|---|
| JP | 2003-099400 A | | 4/2003 |
| JP | 2003-122279 A | | 4/2003 |
| JP | 2003122279 A | * | 4/2003 |
| JP | 2003-271341 A | | 9/2003 |
| JP | 2003-283755 A | | 10/2003 |
| JP | 2004-110399 A | | 4/2004 |
| JP | 2004-110738 A | | 4/2004 |
| JP | 2004110738 A | * | 4/2004 |
| JP | 2004-213128 A | | 7/2004 |
| JP | 2005-204242 A | | 7/2005 |
| JP | 2006-040076 A | | 2/2006 |
| JP | 2006-050236 A | | 2/2006 |

OTHER PUBLICATIONS

Office Action issued in corresponding Japanese Patent Application No. 2006-095842 dated Nov. 12, 2010.

Office Action issued in related co-pending U.S. Appl. No. 11/695,631 dated Feb. 4, 2011.

* cited by examiner

F I G. 4
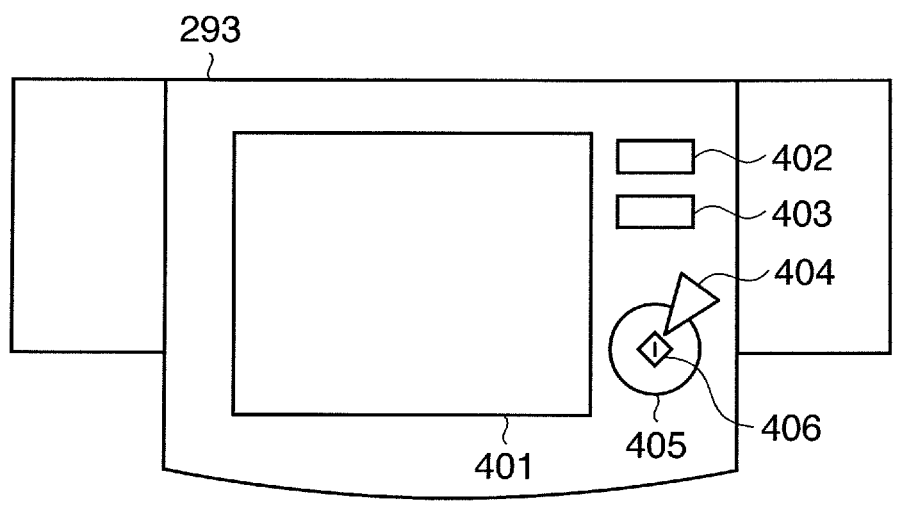

FIG. 8

| # | URL | PRINTING CONDITION |
|---|---|---|
| 1 | http://www.xxx.co.jp/aaa/aaa1.html | DOUBLE-SIDED(2-in-1) + STAPLE(TOP RIGHT) |
| 2 | http://www.xxx.co.jp/aaa/aaa2.html | SINGLE-SIDED + STAPLE(TWO RIGHT) |
| 3 | http://www.xxx.co.jp/bbb/bbb.html | DOWN SCALING(96%) + 5 COPIES |

| # | URL | PRINTING CONDITION | CUMULATIVE SETTING FREQ. |
|---|---|---|---|
| 1 | http://www.xxx.co.jp/aaa/aaa1.html | DOUBLE-SIDED(2-in-1) + STAPLE(TOP RIGHT) | 5 TIMES |
|   |   | DOUBLE-SIDED(4-in-1) + STAPLE(TOP RIGHT) | 3 TIMES |
|   |   | DOUBLE-SIDED(2-in-1) + STAPLE(TWO RIGHT) | 2 TIMES |
| 2 | http://www.xxx.co.jp/aaa/aaa2.html | SINGLE-SIDED + STAPLE(TWO RIGHT) | 3 TIMES |
|   |   | SINGLE-SIDED + STAPLE(TOP RIGHT) | 2 TIMES |
| 3 | http://www.xxx.co.jp/bbb/bbb.html | DOWNSCALING(96%) + 5 COPIES | 1 TIMES |

IMAGE FORMING APPARATUS FOR PRINTING AN OBJECT AND INFORMATION PROCESSING METHOD THEREFOR

BACKGROUND OF THE INVENTION

1. Field of the Invention

The invention relates to a processing technique for printing an object displayed by a browser function of an image forming apparatus.

2. Description of the Related Art

In recent years, multi-function peripherals have been commercialized which include a great many functions based around a digital copying apparatus. Apart from copy, facsimile, printer and scanner functions, multi-function peripherals also include such functions as a saving function for saving scanned image data to a hard disk or the like or a web browser function for browsing web pages.

In order to operate a plurality of functions, the operation panel of multi-function peripherals has increased in size in recent years. As a result, the operation panel acts not only as an operation setting apparatus for executing the above functions, but also as a display apparatus which monitors the operation and status of remote devices on a network, for example. Further, the operation panel acts as a display apparatus for displaying web pages when using a web browser function.

Combining the web browser function with the printer function enables browsed web pages to be printed simply by pressing the Start button (e.g., see JP 2003-122279A).

However, web pages generally come in a variety of sizes. Thus if a web page cannot be fully displayed on a display panel of fixed size, the entire web page can be viewed using a scroll function. In the case of printing web pages, on the other hand, part of the printed web page may end up being cut off when attempting to print in a fixed format, sometimes making it impossible to print in the designated format. This causes a lack of user-friendliness, since the user must select the optimal printing condition each time a web page is printed.

SUMMARY OF THE INVENTION

An object of the invention, which was made in consideration of the above problem, is to simplify the setting of print parameters when printing an object displayed by a browser function of an image forming apparatus.

To achieve the above object, an image forming apparatus according to the invention comprises the following configuration. That is, an image forming apparatus capable of printing an object displayed by a browser comprises searching unit configure to, if printing of an object displayed by the browser is instructed, search for storage unit capable of storing one or more pieces of information each of which associates the printing conditions of an object with a storage location of the object; reading unit configured to read the printing conditions associated with the storage location of the object whose printing is instructed, based on a result of the search by the searching unit; and printing unit configured to print the object based on the printing conditions read by the reading unit.

To achieve the above object, an information processing method according to the invention comprises the following configuration. That is, an information processing method in an image forming apparatus capable of printing an object displayed by a browser comprises the steps of searching, if printing of an object displayed by the browser is instructed, storage unit capable of storing one or more pieces of information each of which associates the printing conditions of an object with the storage location of the object; reading the printing conditions corresponding to the storage location of the object whose printing is instructed, based on the result of the search in the searching step; and printing the object based on the printing conditions read in the reading step.

According to the present invention, the setting of a printing conditions can be simplified when printing an object displayed by the browser function of an image forming apparatus.

Further features of the invention will become apparent from the following description of exemplary embodiments with reference to the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 shows an external configuration of an operation unit 293.

FIG. 8 shows an exemplary URL table.

FIG. 11 shows an exemplary URL table.

DESCRIPTION OF THE EMBODIMENTS

Preferred embodiments of the invention will now be in described in accordance with the accompanying drawings.

First Embodiment

1. Network Configuration Diagram

Figure 1:
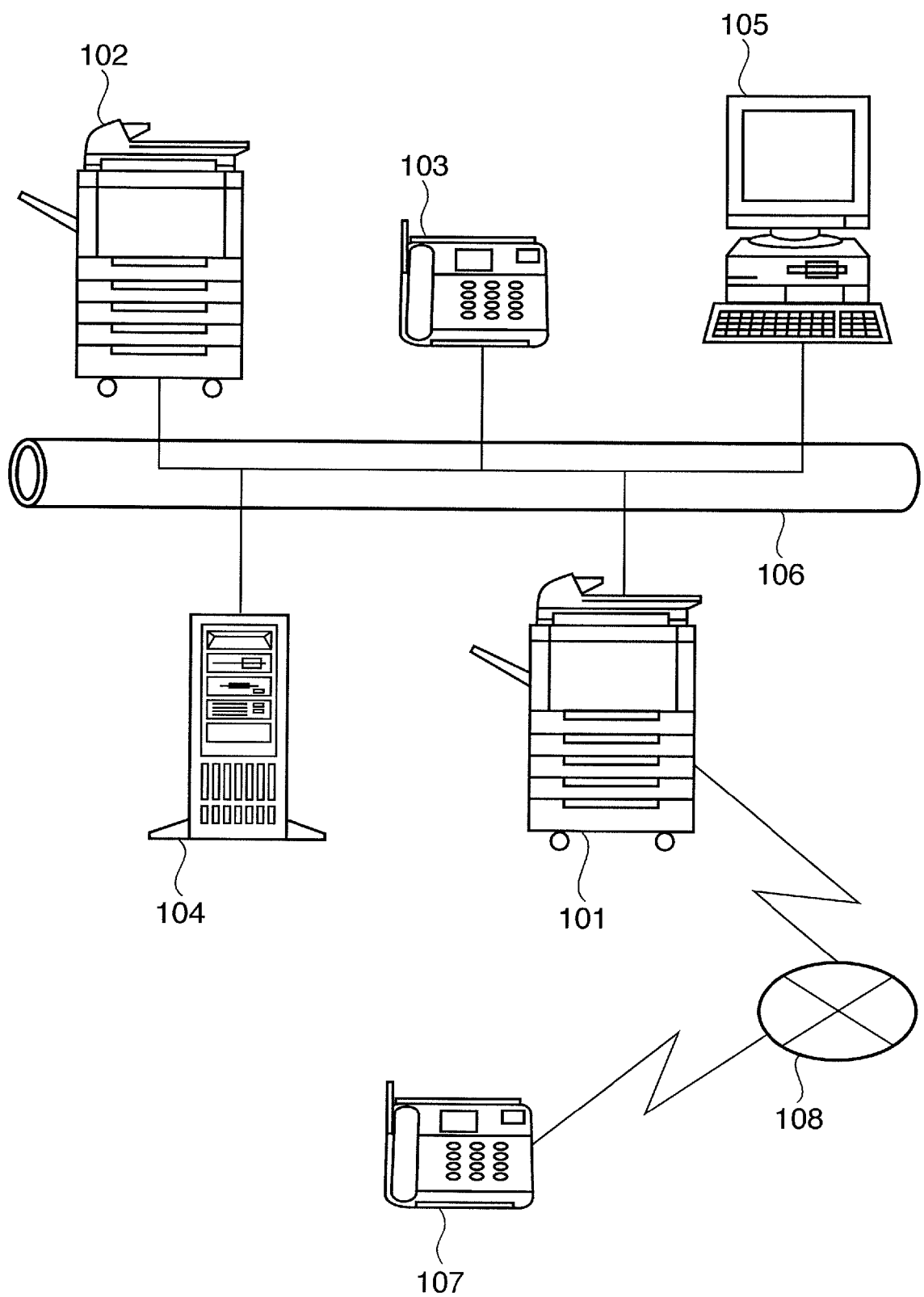
FIG. 1 shows an exemplary network configuration that includes an MFP according to an embodiment of the invention.

FIG. 1 shows an exemplary network configuration that includes an image forming apparatus according to an embodiment of the invention. The present embodiment will be described using a multifunction peripheral ("MFP"), which is a multi-function peripheral with a data transmission function, as an image forming apparatus.

An MFP 101 can be connected for use to a LAN 106 consisting of Ethernet (registered trademark) or the like, together with an MFP 102 with equivalent functions to the MFP 101, a facsimile 103, a database/mail server 104, and a client computer 105. The MFP 101 can also, along with a facsimile 107, be connected to and used with a public line 108.

The MFP 101 has a network function for reading document images and transmitting read image data to apparatuses over the LAN 106, along with a copy function and a facsimile function. The MFP 101 also has a PDL function, making it possible to receive PDL images provided by the client computer 105 or the like connected over the LAN 106, and print received PDL images.

The MFP 101 also has a box function for saving images read by the MFP 101 and PDL images provided by the client computer 105 connected over the LAN 106 to a specified box area of a hard disk drive (HDD) 204 (to be described later). Printing of images saved in the box area is also possible.

Further, the MFP 101 is able to receive data read by the MFP 102 via the LAN 106, and to save to the HDD 204 in the MFP 101 and print out received data. The MFP 101 is also able to receive images on the database/mail server 104 via the client computer 105 and the LAN 106, and to save in the MFP 101 and print out received images.

Further, the MFP 101 also has a web browser function for accessing a web server (not shown) connected via the public line 108, and displaying web pages on the web server.

The facsimile 103 is able to receive data read by the MFP 101 via the LAN 106, and transmit received data. The database/mail server 104 is able to receive data read by the MFP 101 via the LAN 106, store received data in a database, and transmit stored data as e-mail.

The client computer 105 is connected to the database/mail server 104, and is able to acquire and display desired data from the database/mail server 104. The client computer 105 is also able to receive data read by the MFP 101 via the LAN 106, and process/edit received data.

The facsimile 107 is able to receive data read by the MFP 101 via the public line 108, and print out received data.

2. Block Diagram of Main Configuration of MFP 101

Figure 2:
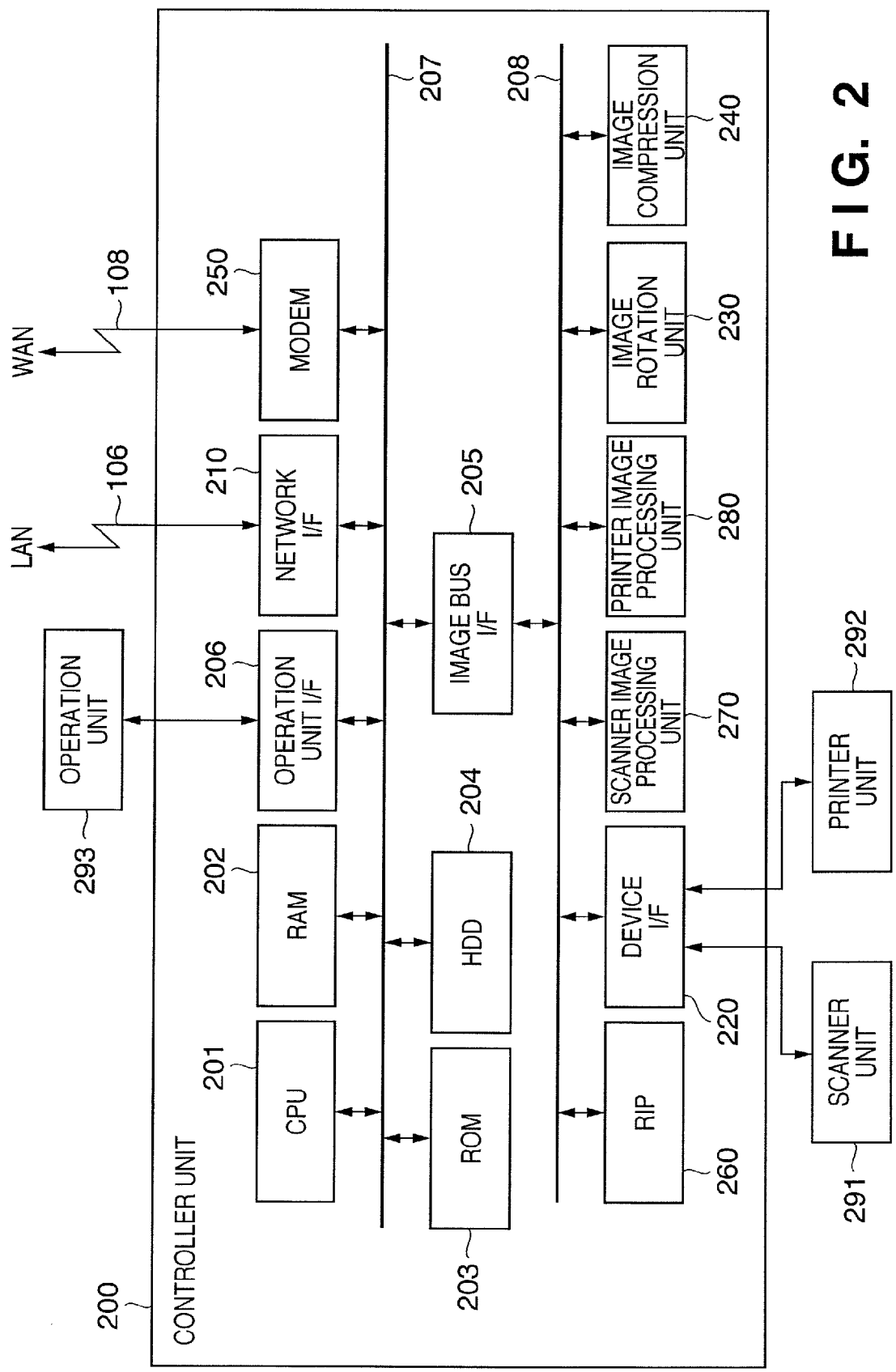
FIG. 2 is a block diagram showing the main configuration of an MFP 101.

FIG. 2 is a block diagram showing the main configuration of the MFP 101. In FIG. 2, a controller unit 200 is connected to a scanner unit 291, which is an image input device, and a printer unit 292, which is an image output device. The controller unit 200 performs control required to realize the copy function using the printer unit 292 to print image data read by the scanner unit 291. The controller unit 200 is also connected to the LAN 106 and the public line 108 (WAN), and performs controls for inputting/outputting image information and device information.

The controller unit 200, specifically, includes a CPU 201 which boots the operating system (OS) using a boot program stored in a ROM 203. The CPU 201 also executes various processing by executing application programs stored in the HDD 204 on the OS. Apart from programs for realizing the copy function, the application programs referred to here include programs for realizing the send/fax function, the box function, and the web browser function. Programs for realizing the network function for performing external data transmission/reception are also included.

A RAM 202 is used as a work area of the CPU 201. In addition to the work area, the RAM 202 provides an image memory area for temporarily storing image data. The HDD 204 stores image data, along with the application programs.

An operation unit interface (operation unit I/F) 206 and a network interface (network I/F) 210 are connected to the CPU 201 via a system bus 207, along with the ROM 203 and the RAM 202. A modem 250 and an image bus interface (image bus I/F) 205 are also connected.

The operation unit I/F 206 is an interface with an operation unit 293 having a touch panel, and outputs image data to the operation unit 293 for display on the operation unit 293. The operation unit I/F 206 also sends information input by a user to the operation unit 293 to the CPU 201.

The network I/F 210 is connected to the LAN 106, and inputs/outputs information with apparatuses over the LAN 106. The modem 250 is connected to the public line 108, and inputs/outputs information via the public line 108.

The image bus I/F 205 is connected to the system bus 207 and an image bus 208 for high speed transfer of image data, and is a bus bridge for converting data structures. The image bus 208 is configured from a PCI bus or an IEEE 1394 bus. A raster image processor (hereinafter "RIP") 260, a device I/F 220, a scanner image processing unit 270, a printer image processing unit 280, an image rotation unit 230, and an image compression unit 240 are provided on the image bus 208.

The RIP 260 expands PDL code into bitmap images. The scanner unit 291 and the printer unit 292 are connected to the device I/F 220, which performs synchronous/asynchronous conversion of image data. The scanner image processing unit 270 corrects, processes, and edits input image data. The printer image processing unit 280 performs the correction, resolution conversion and like processing of the printer on printout image data.

The image rotation unit 230 rotates image data. The image compression unit 240 compresses multivalued image data into JPEG data and binary image data into data such as JBIG, MMR or MH, in addition to decompressing compressed data.

3. Hardware Configuration of MFP 101

Figure 3:
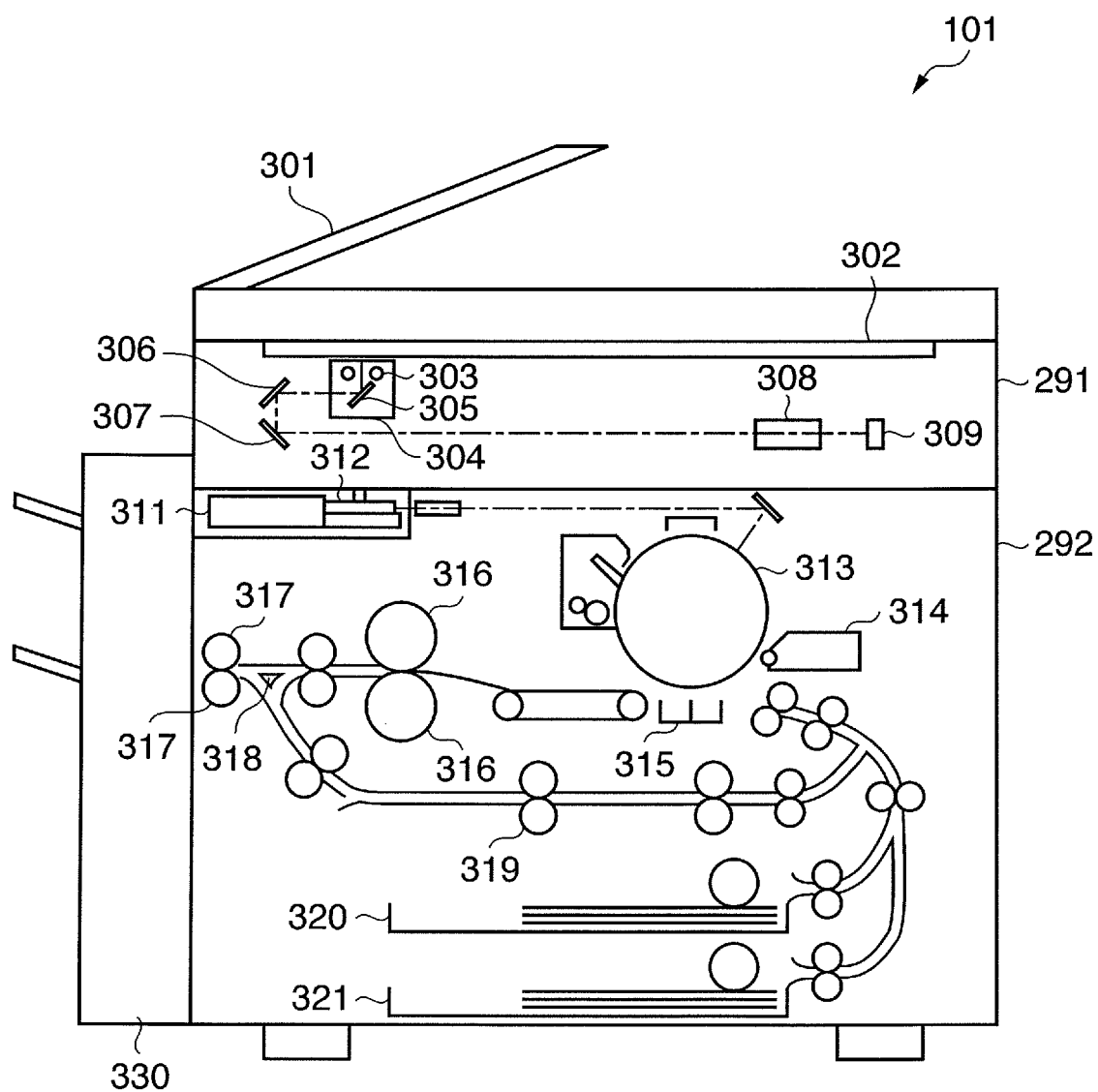
FIG. 3 schematically shows a hardware configuration of a scanner unit 291 and a printer unit 292 of the MFP 101 in FIG. 1.

FIG. 3 schematically shows the hardware configuration of the scanner unit 291 and the printer unit 292 of the MFP 101 in FIG. 1.

The scanner unit 291 and the printer unit 292 are integrally configured, as shown in FIG. 3. The scanner unit 291 is equipped with a document feeder unit 301 which feeds a document in order from the beginning over a platen glass 302 one sheet at a time, and discharges the document into a discharge tray (not shown) each time reading of a document has ended.

When a document is fed over the platen glass 302, the scanner unit 291 illuminates a lamp 303 and starts moving a moving unit 304. The document on the platen glass 302 is read and scanned as a result of the movement of this moving unit 304. During the reading and scanning, reflected light from the document is directed to a CCD image sensor (hereinafter, "CCD") 309 via mirrors 305, 306, 307 and a lens 308, and the image on the document is formed on an image sensing surface of the CCD 309. The CCD 309 converts the image formed on the image sensing surface to an electrical signal, which is input to the controller unit 200 (not shown in FIG. 3) after having prescribed processing performed thereon.

The printer unit 292 has a laser driver 311 that drives a laser light emitting unit 312 based on image data input from the controller unit 200. Laser light is thereby emitted from the laser light emitting unit 312 according to the image data, and irradiated on a photoconductive drum 313 while being scanned.

An electrostatic latent image is formed on the photoconductive drum 313 by the irradiated laser light, and this electrostatic latent image is visualized as a toner image by toner supplied from a developer 314. Recording paper is fed between the photoconductive drum 313 and a transferring unit 315 from a cassette 320 or 321 via a feeding path in synchronization with the timing of the laser light irradiation, and the toner image on the photoconductive drum 313 is transferred to the recording paper fed by the transferring unit 315.

The recording paper to which the toner image has been transferred is sent to a fixing roller pair (heating roller, pressure roller) 316 via a transport belt, and the fixing roller pair 316 hot presses the recording paper to fix the toner image on the recording paper to the recording paper. The recording paper, having passed through the fixing roller pair 316, is discharged to a discharge unit 330 by a discharge roller pair 317. The discharge unit 330 consists of a sheet processing apparatus capable of performing post-processing such as sorting and stapling. If the double-sided recording mode is set, the recording paper is transported as far as the discharge roller pair 317, before reversing the rotation direction of the discharge roller pair 317, and directing the recording paper to a re-feeding path 319 using a flapper 318. The recording paper, having been directed to the re-feeding path 319, is re-fed between the photoconductive drum 313 and the transferring unit 315 at the above timing, and a toner image is transferred to the back surface of the recording paper.

4. External Appearance of Operation Unit of MFP 101

The external configuration of the operation unit 293 is shown next in FIG. 4. An LCD display unit 401, composed of a touch panel sheet affixed to an LCD, displays a system operation screen, and conveys the position information of displayed keys that have been pressed to the CPU 201 of the controller unit 200.

A Start key 405 is used when starting the reading of a document image via the scanner unit 291, for instance. There is a green and red two-color LED 406 in a central portion of the Start key 405 which shows whether the Start key 405 is in a usable state depending on the color. A Stop key 404 works to stop an operation that is being performed. An ID key 403 is used when inputting the user ID of a user. A User Mode key 402 is used when setting a user mode via the operation screen displayed on the LCD display unit 401.

5. Screen of Operation Unit 293

Figure 5:
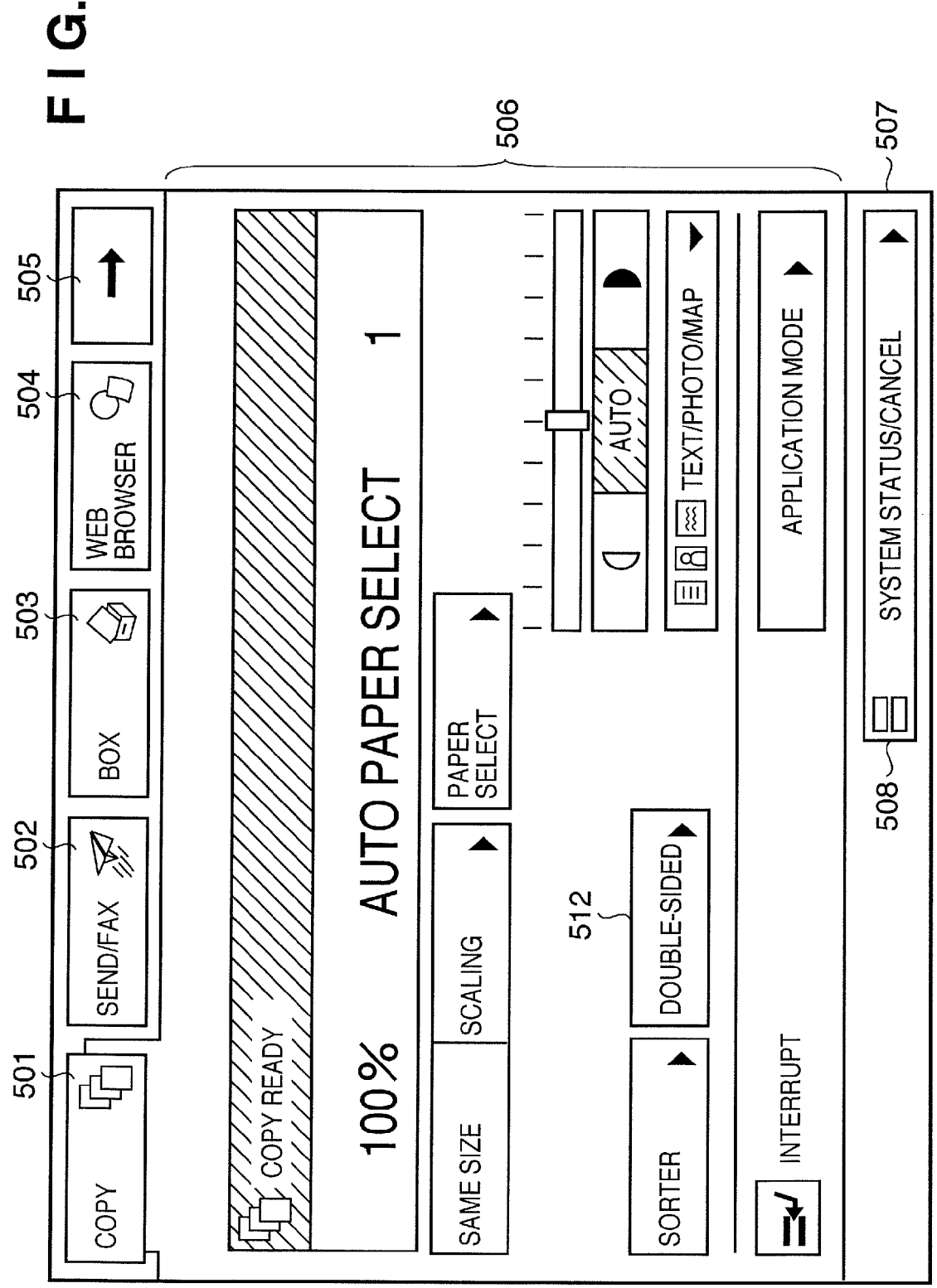
FIG. 5 shows an exemplary operation screen displayed on an LCD display unit 401 of the operation unit 293.

FIG. 5 shows an exemplary operation screen displayed on the LCD display unit 401 of the operation unit 293.

As shown in FIG. 5, a plurality of touch keys such as a Copy key 501, a Send/Fax key 502, a Box key 503, and a Web Browser key 504 are displayed per function as tabs in an upper portion of the operation screen.

Note that FIG. 5 shows the initial screen of the copy function displayed when the Copy key 501 is depressed. As shown in FIG. 5, a status message ("Copy Ready") showing that the copy function is executable is displayed in an upper portion of the initial screen 506 of the copy function, and below that is displayed the scaling factor, the selected paper feed cassette, and the number of copies.

A Same Size key, a Scaling key, a Paper Select key, a Sorter key, a Double-Sided key, an Interrupt key, and a Text/Photo/Map key are displayed as touch keys for setting the operation modes of the copy function. A left arrow key corresponding to lightening, a right arrow key corresponding to darkening, and an auto key for automatic adjustment of density are displayed for density adjustment. Note that operation modes which cannot be fit onto the initial screen are specified by depressing an application mode key to display settings screens hierarchically within the initial screen.

A display area 507 is for displaying the status of the MFP 101. For example, an alarm message indicating paper jam, or a status message that shows "Printing PDL" is displayed when printing a PDL image.

Reference number 508 denotes a System Status/Cancel key. A screen displaying the device information of the MFP 101, or a screen displaying the print job status (not shown) is displayed by depressing this key, with it being possible to cancel a job via this screen.

When the Send/Fax key 502 is depressed, a settings screen (not shown) is displayed for performing FTP transmission and e-mail transmission of images read via the scanner unit 291 to a device (facsimile 103, etc.) on the LAN 106. As a result of this settings screen, a read image can also be transmitted to the facsimile 107 using the public line 108.

When the Box key 503 is depressed, a settings screen (not shown) is displayed. This settings screen enables settings for saving (registering) an image read by the MFP 101 to the box area in the HHD 204, specifying image data saved in the box area for printing, and transmitting saved image data to devices on the LAN 106.

When the Web Browser key 504 is depressed, a web browser screen is displayed that enables browsing of objects such as HTML files (hereinafter, simply "web pages"). Note that the web browser screen will be described in detail below.

Note that if the controller unit 200 is equipped with five or more functions, a right arrow key 505 is displayed to the right of the four function keys Copy, Send/Fax, Box and Web Browser.

6. Description of Web Browser Screen

Figure 6:
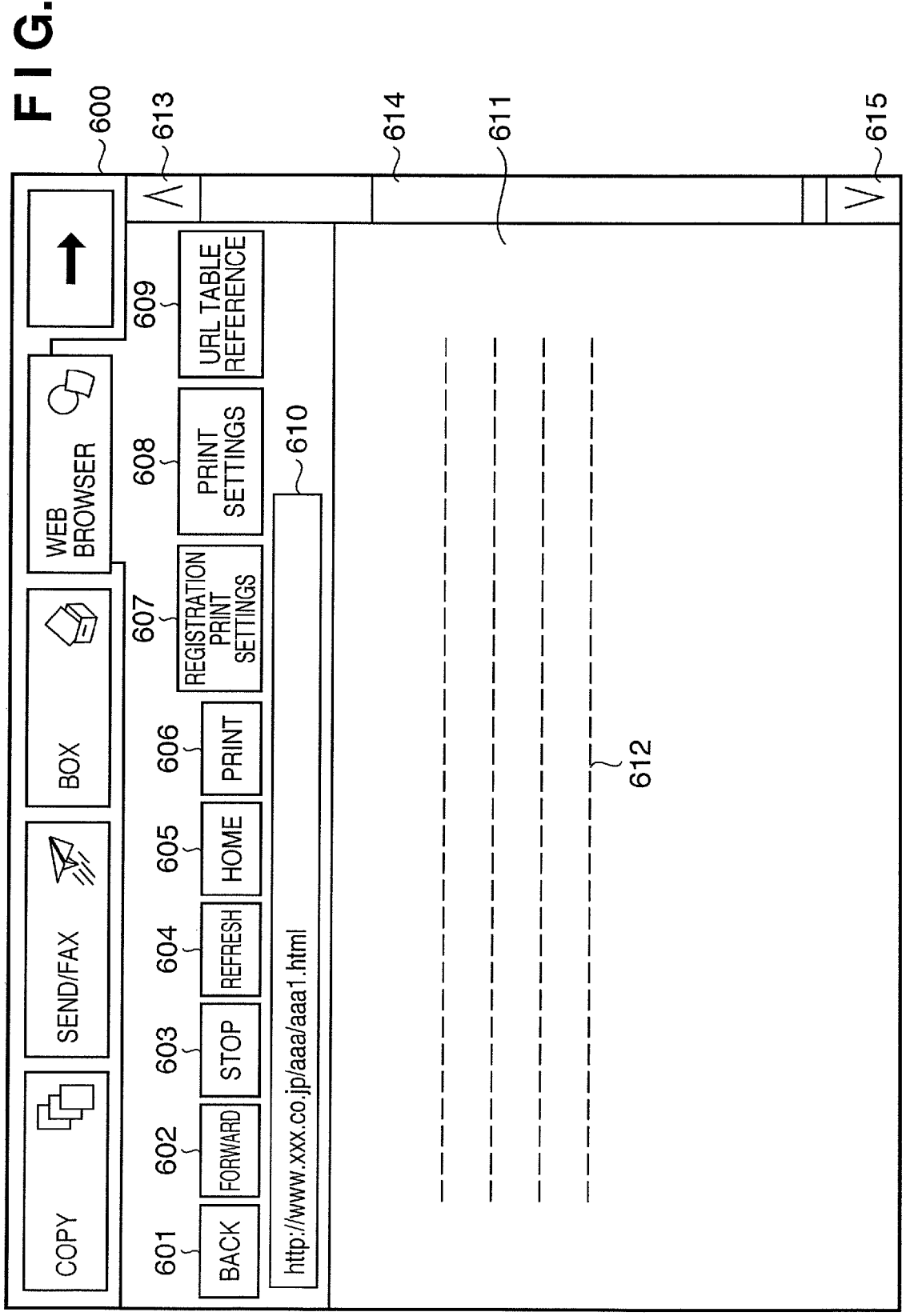
FIG. 6 shows an exemplary web browser screen.

FIG. 6 shows an exemplary web browser screen displayed by depressing the Web Browser key 504. The web browser screen shown in FIG. 6 will be described in detail below.

Reference number 610 denotes a URL input unit that is depressed when specifying a URL to open a web page. A soft keyboard (not shown) is displayed by depressing the URL input unit 610, enabling the user to specify a URL.

Reference number 601 denotes a Back key for returning to the previous web page. Reference number 602 denotes a Forward key for proceeding to the next web page. Reference number 604 denotes a Refresh key for reloading the web page currently being displayed. Reference number 603 denotes a Stop key for stopping the reading of a web page. Reference number 605 denotes a Home key for moving to the web page of a preset URL.

Reference number 611 denotes a display area for displaying a loaded web page. Reference number 612 denotes an example of a web page displayed in the display area 611. Here, the text of a web page typified by HTML is displayed. Reference number 614 denotes a scroll bar for scrolling the display area 611. Reference number 613 denotes a button for scrolling up the display area 611, while reference number 615 denotes a button for scrolling down the display area 611.

Reference number 606 denotes a Print key. When the Print key 606 is depressed, printing of the web page currently being displayed in the display area 611 is commenced (note that printing will be described in detail later). Reference number 608 denotes a Print Setting key. A print setting window is displayed by depressing the Print Setting key, enabling various printing conditions for printing a web page to be set. The Print Setting key 608 is used when newly setting printing conditions. Reference number 607 denotes a Print Setting Registration key that is used when registering, as a URL table (to be described later), printing conditions which have been set.

Figure 9:
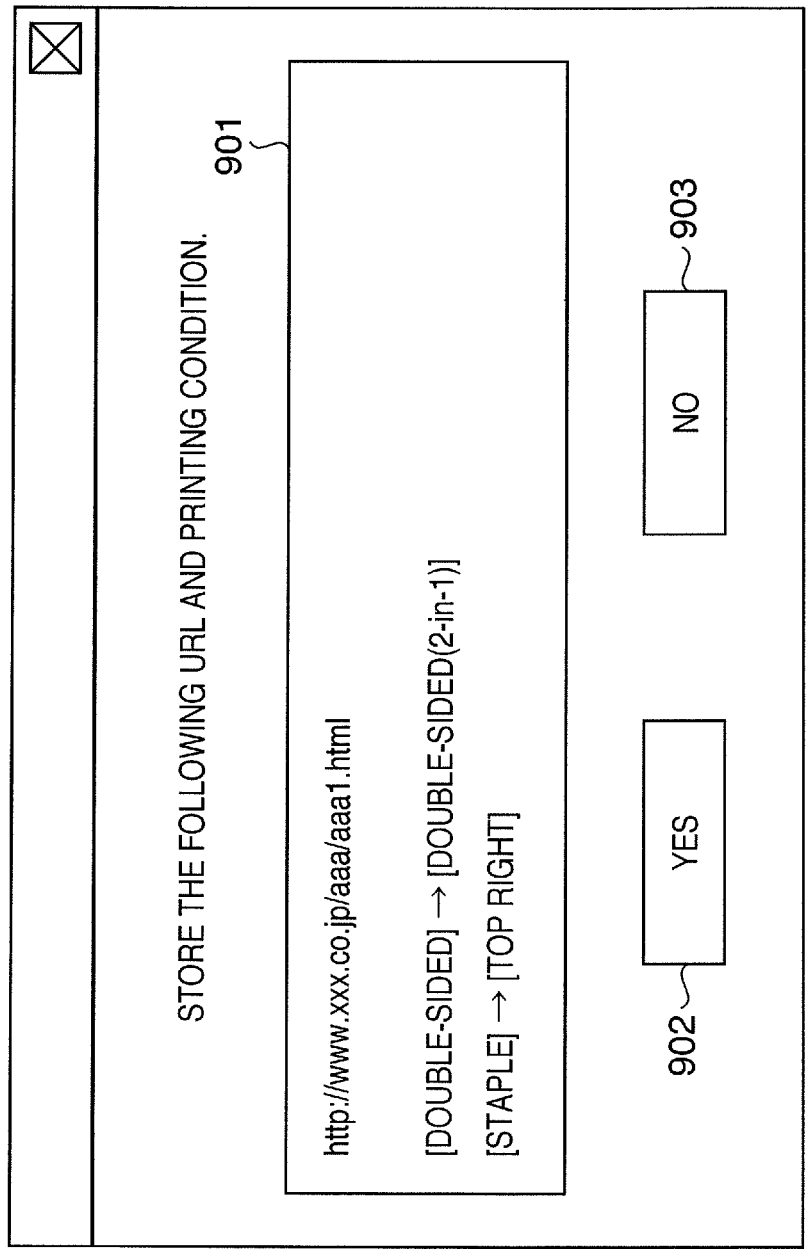
FIG. 9 shows an exemplary print setting window.

When the Print Setting Registration key 607 is depressed, a registration details display screen as shown in FIG. 9 is displayed. In FIG. 9, reference number 901 denotes an area showing the printing conditions currently set. By the user depressing a "YES" key 902 after confirming the printing conditions displayed in the area 901, the printing conditions and the URL of the web page displayed in the area 901 are registered in a URL table of the HDD 204 in association with each other. It is thereby possible to use the printing conditions registered in the URL table the next time the web page of the URL is printed. Registration is cancelled when a "NO" key 903 is depressed, and registration in the URL table is not performed.

Note that the example in FIG. 9 shows a state in which the set printing condition is "Double-Sided (2-in-1)", which entails double-sided printing with two pages worth of the web page of a given URL displayed in the area 901 being downscaled as necessary and printed together on one side of a single page, and "Staple (Top Right)", which entails stapling the sheets at the top right corner.

FIG. 8 shows an exemplary URL table stored in the HDD 204 in which URLs are associated with printing conditions as a result of the "YES" key 902 being depressed. In FIG. 8, reference number 801 denotes an area for storing URLs, while reference number 802 denotes an area for storing printing conditions corresponding to the URLs stored in the area 801.

Returning again to FIG. 6, reference number 609 denotes a URL Table Reference key that is used when displaying a registered URL table. The URL table shown in FIG. 8, for example, is displayed as a result of depressing the URL Table Reference key.

7. Flow of Printing in the Web Browser Function

Figure 7:
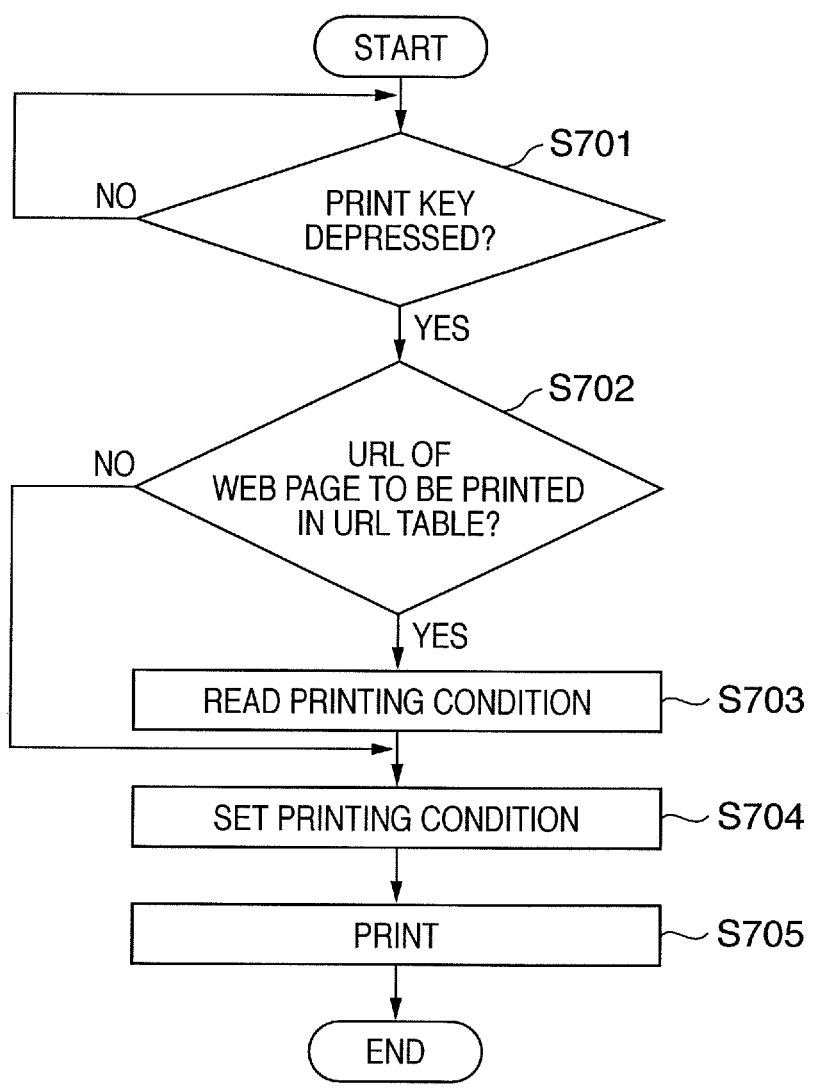
FIG. 7 is a flowchart showing the flow of printing by an MFP according to a first embodiment of the invention.

The flow of printing in the web browser function of the MFP 101 according to the present embodiment will be described next using FIG. 7. FIG. 7 is a flowchart showing the flow of printing in the web browser function of the MFP 101 according to the present embodiment. The processing shown in this flowchart is started as a result of the web browser key 504 of FIG. 5 being depressed to display the web browser display screen of FIG. 6.

At step S701, it is determined whether the Print key 606 has been depressed. If it is determined in step S701 that the Print key 606 has been depressed, processing proceeds to step S702.

At step S702, the URL table (FIG. 8) registered in the HDD 204 is referred to. The URL table (FIG. 8) is searched for the URL of the web page to be printed (i.e., the web page displayed in the display area 611).

If it is determined in step S702 that the URL of the web page to be printed exists in the URL table (FIG. 8), processing proceeds to step S703. At step S703, the printing conditions registered in the URL table are read.

At step S704, the printing conditions read in step S703 are set in the MFP 101. Note that the printing conditions set in step S704 are displayed in the display area 611 of FIG. 6, along with an "OK" button and a "Cancel" button (not shown) If the "OK" button is depressed, processing proceeds to step S705, where printing is executed based on the printing conditions. On the other hand, if the "Cancel" button is depressed, printing is not performed. Note that the user is able to change the printing conditions set in step S704 before pressing the "OK" button.

On the other hand, if it is determined in step S702 that the URL of the web page to be printed does not exist in the URL table, processing proceeds to step S704. In this case, a print setting window for when printing conditions have not been set (i.e., the Printing Conditions column is empty or a default value has been set) is displayed in the display area of FIG. 6. The user is prompted to input print settings, and the MFP 101 waits for the input of print settings by the user. In this case, the user here performs initial printing condition settings. After having set the printing conditions at step S704, the user is able to newly register or update print settings in the URL table of FIG. 8 by depressing the Print Setting Registration key 607. If the URL of the web page to be printed does exist in the URL table, and the user changes the printing conditions at step S704, the printing conditions related to the URL in the URL table are updated by being overwritten with the modified printing conditions. On the other hand, if the URL of the web page to be printed does not exist in the URL table, the printing conditions set at step S704 and the URL are newly registered in the URL table.

As is evident from the above description, the MFP according to the present embodiment sets printing conditions with reference to a registered URL table when printing a web page displayed by the web browser function. User-friendliness is thus improved since the user is saved the trouble of setting printing conditions each time printing is performed.

Second Embodiment

The first embodiment was described in relation to a single printing condition being registered per URL in the URL table, although the invention is not particularly limited to this. A plurality of printing conditions may be registered per URL in the URL table. The present embodiment will be described in relation to a URL table capable of registering a plurality of printing conditions per URL, as well as printing performed using this URL table.

1. URL Table

FIG. 11 shows an exemplary URL table of the MFP 101 according to the present embodiment. The same reference numbers are appended to portions that are common to the URL table (FIG. 8) illustrated in the first embodiment.

A difference with FIG. 8 is the registration of a plurality of printing conditions for a single URL in the area 802 for registering printing conditions. Also, a Cumulative Setting Frequency column 1101 is provided in correspondence with the plurality of printing conditions. The cumulative setting frequency registered in the Cumulative Setting Frequency column 1101 shows the number of times that the user has previously used each printing condition to print the single web page shown by the URL.

In the FIG. 11 example, three different printing conditions are registered for when the URL "http://www.XXX.co.jp/aaa/aaa1.html" is printed. Of these, printing has previously been performed five times using the printing condition "Double-Sided(2-in-1)+Staple(Top Right)". Printing has previously been performed three times using the printing condition "Double-Sided(4-in-1)+Staple(Top Right)". And printing has previously been performed two times using the printing condition "Double-Sided(2-in-1)+Staple(Two Right)".

2. Printing Flow

Figure 10:
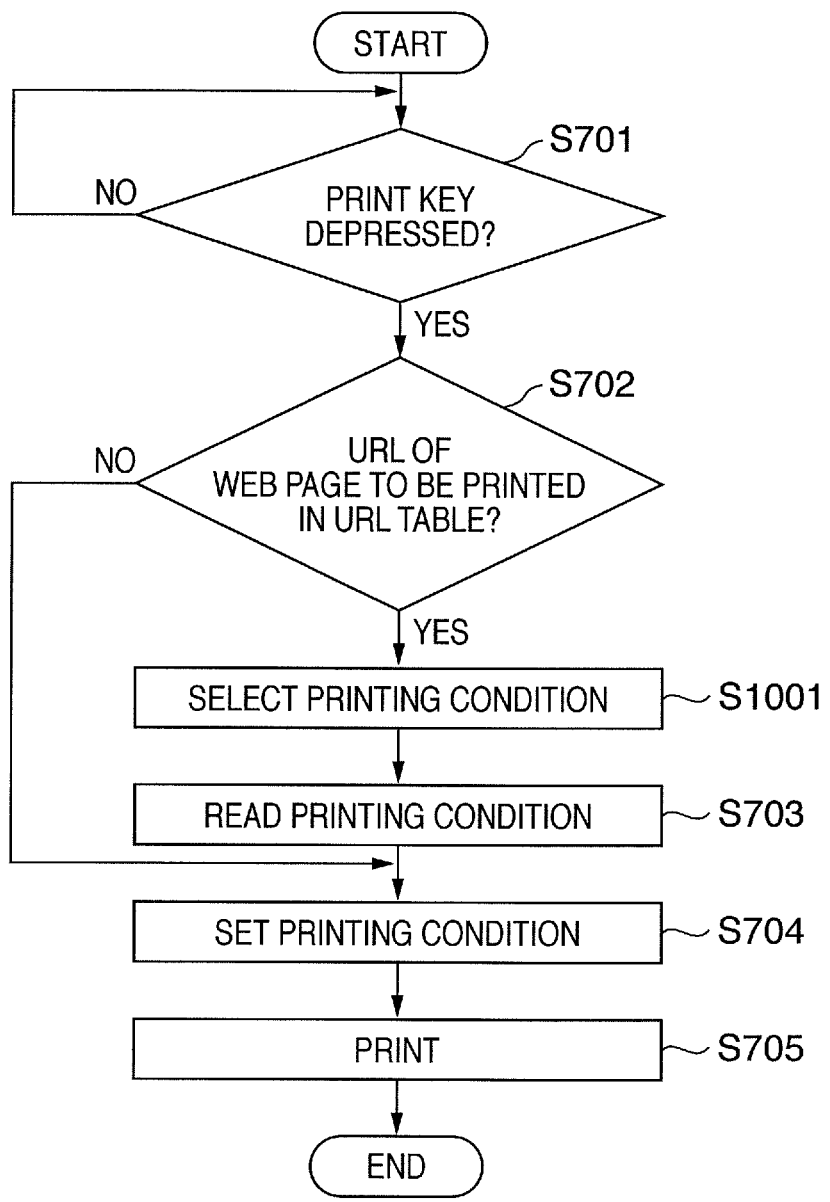
FIG. 10 is a flowchart showing the flow of printing by an MFP according to a second embodiment of the invention.

FIG. 10 is a flowchart showing the flow of printing in the web browser function of the MFP 101 according to the present embodiment. The same reference numbers are appended to portions that are common to the flowchart (FIG. 7) shown in the first embodiment.

A difference with FIG. 7 is the inclusion of a printing condition selection process at step S1001. With the flowchart of FIG. 7, if it is determined in step S702 that the URL of the web page to be printed exists in the URL table, the printing condition registered in the URL table is read and displayed in the display area 611 of FIG. 6. In contrast, with the MFP according to the present embodiment, a plurality of printing conditions may be registered in the URL table, so all registered printing conditions are initially displayed in the display area 611, so as to enable the user to select a single printing condition.

Figure 12:
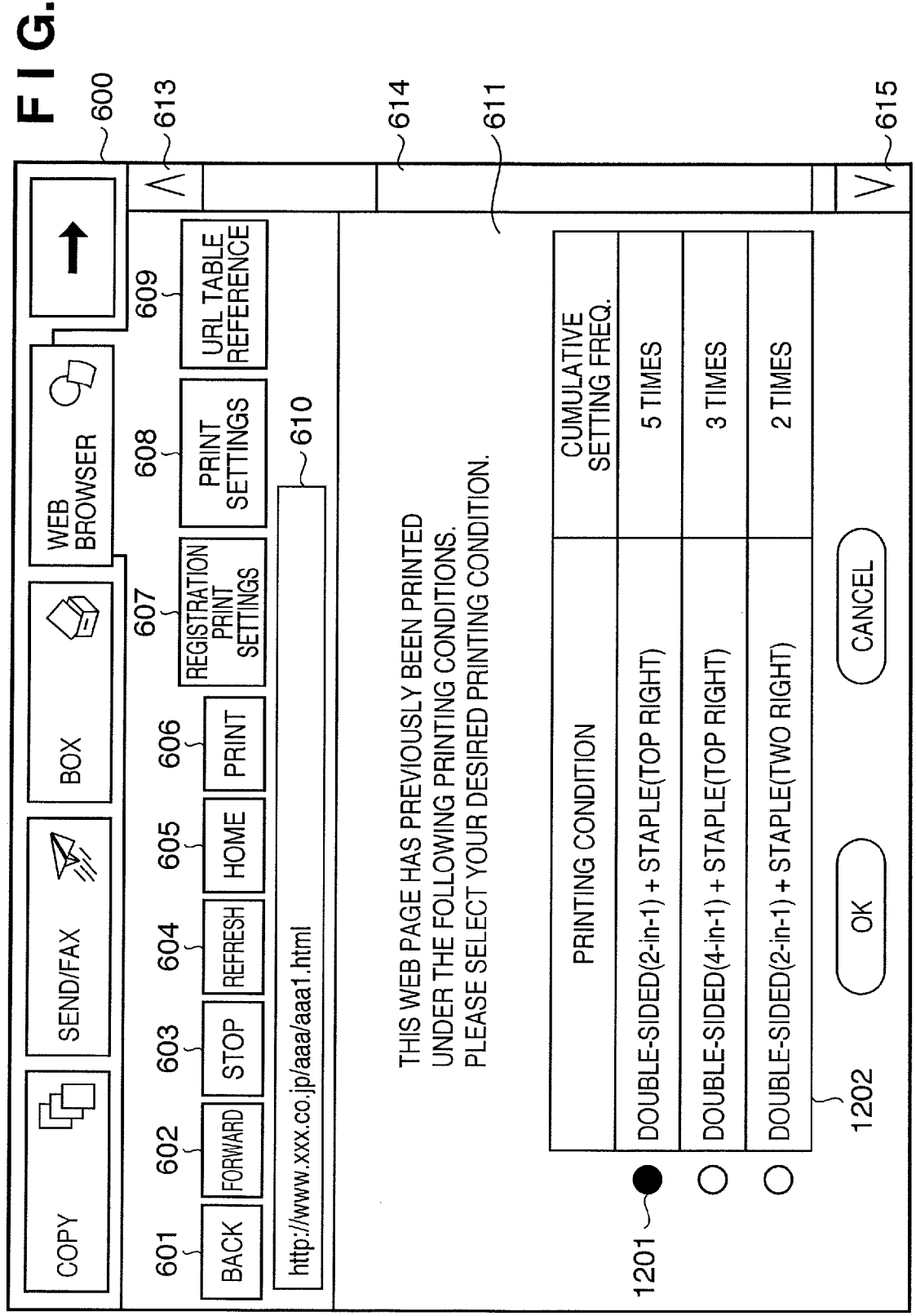
FIG. 12 shows exemplary display content displayed in a display area 611, when it is determined that the URL of a web page to be printed exists in the URL table.

FIG. 12 shows exemplary display content displayed in the display area 611, in the case where it is determined in step S702 that the URL of a web page to be printed exists in the URL table.

As shown in FIG. 12, a plurality of printing conditions (1202) corresponding to the URL of the web page to be printed are displayed. To the left of the displayed printing conditions (1202) is displayed a selection column (1201) showing the printing condition selected by the user.

As a result, the printing condition selected in the selection column (1201) is read at step S703.

As is evident from the above description, the MFP according to the present embodiment refers to a pre-registered URL table when printing a web page displayed by the web browser function, and if a plurality of printing conditions are registered, the MFP selectably displays these printing conditions.

User-friendliness is thereby improved, since the user simply selects the desired printing condition from the displayed printing conditions, without needing to go through the process of setting the printing condition from the beginning.

Third Embodiment

In the first and second embodiments, a URL table stored in the HDD 204 of the apparatus is referred to, although the invention is not particularly limited to this. For example, an URL table stored in another device (MFP 102, facsimile 107, etc.) communicably connected via the LAN 106 or the public line 108 may be referred to.

1. Printing Flow

Figure 13:
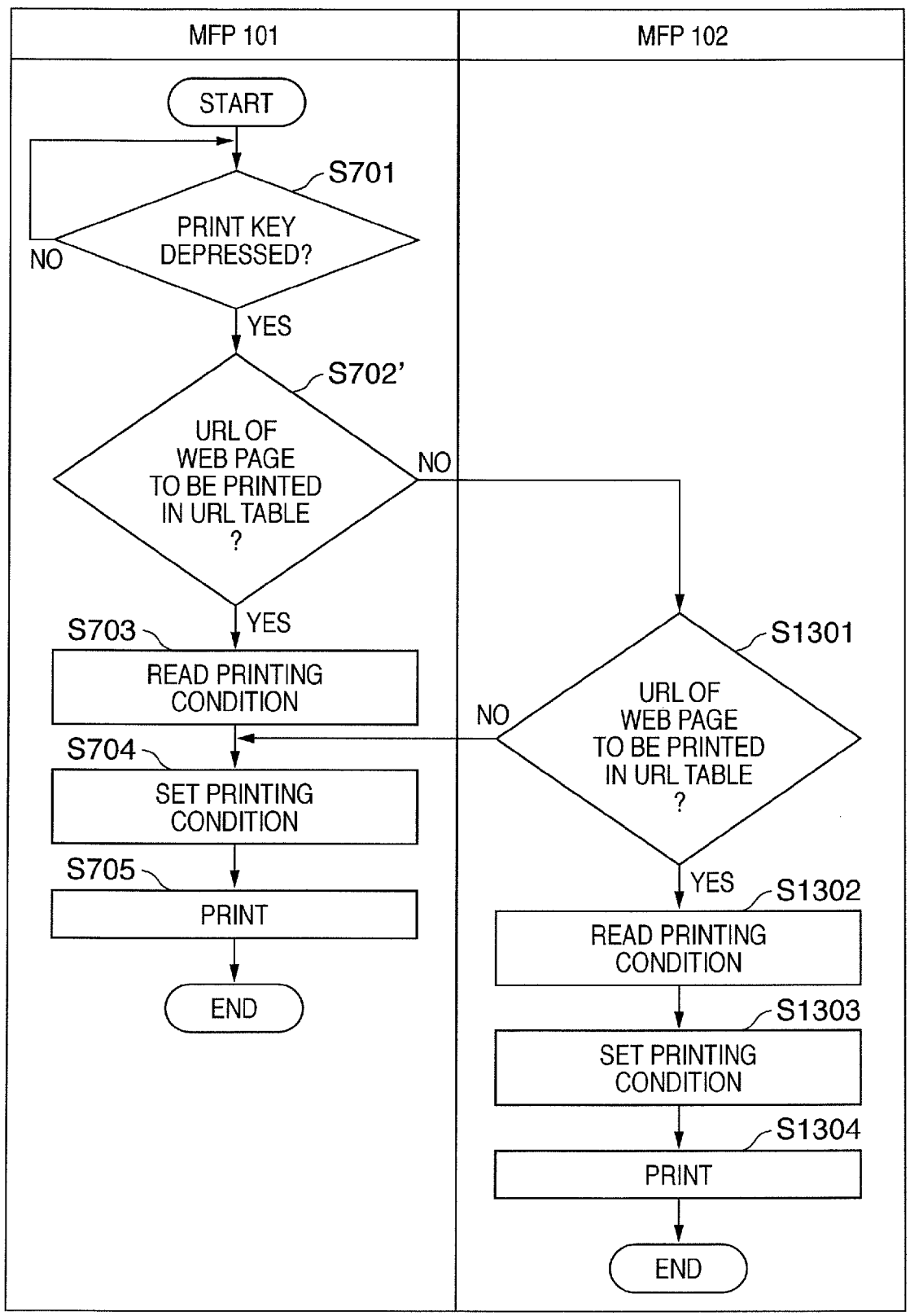
FIG. 13 is a flowchart showing the flow of printing in the MFP 101 and an MFP 102 connected to the MFP 101 via a LAN 106 according to a third embodiment of the invention.

FIG. 13 is a flowchart showing the flow of printing using the MFP 101 and the MFP 102 connected to the MFP 101 via the LAN 106 according to the present embodiment. The left and right columns of FIG. 13 respectively show the processing flows in the MFP 101 and the MFP 102. The same reference numbers are appended to portions of the flowchart shown in the left column of FIG. 13 that are common to FIG. 7. The difference between FIG. 7 and the left column of FIG. 13 is the process of step S702'.

With the flowchart of FIG. 7, if it is determined that the URL of a web page to be printed does not exist in the URL table in the HDD 204, the print setting window for when a printing condition has not been set is displayed in the display area 611 of FIG. 6. In contrast, the MFP 101 according to the present embodiment inquires as to whether the URL of the web page to be printed exists in the URL table of the MFP 102.

It is then determined whether the URL of the web page to be printed by the MFP 101 exists in the URL table in the HDD of the MFP 102 (step S1301). If it is determined that the URL of the web page to be printed by the MFP 101 does not exist in the URL table in the HDD of the MFP 102, a notification to this effect is sent to the MFP 101. In this case, the MFP 101 displays the print setting window for when a printing condition has not been set in the display area 611 (i.e., the user must sets the printing condition).

On the other hand, if it is determined in step S1301 that the URL of the web page to be printed by the MFP 101 does exist in the URL table in the HDD of the MFP 102, processing proceeds to step S1302. At step S1302, the printing condition registered in the URL table is read.

At step S1303, the printing condition read in step S1302 is set in the MFP 102. In step S1304, printing is then executed based on the printing condition set in step S1303 (step S1304).

As is evident from the above description, the MFP according to the present embodiment refers not only to its own registered URL table but also to the registered URL table of other apparatuses, when printing a web page displayed by the web browser function. Thus, if a printing condition corresponding to the desired URL does not exist in an operated apparatus but exists in other apparatus, printing is possible using the printing condition in the other apparatus. That is, user-friendliness is improved, since the user does not need to go through the process of setting the printing condition from the beginning, even when a printing condition corresponding to the desired URL does not exist in the operated apparatus.

Fourth Embodiment

The third embodiment was described in relation to a single printing condition being registered per URL in URL tables stored in the HDDs of one apparatus (MFP 101) and another apparatus (MFP 102), although the invention is not particularly limited to this. For example, a plurality of printing conditions may be registered per URL.

Figure 14:
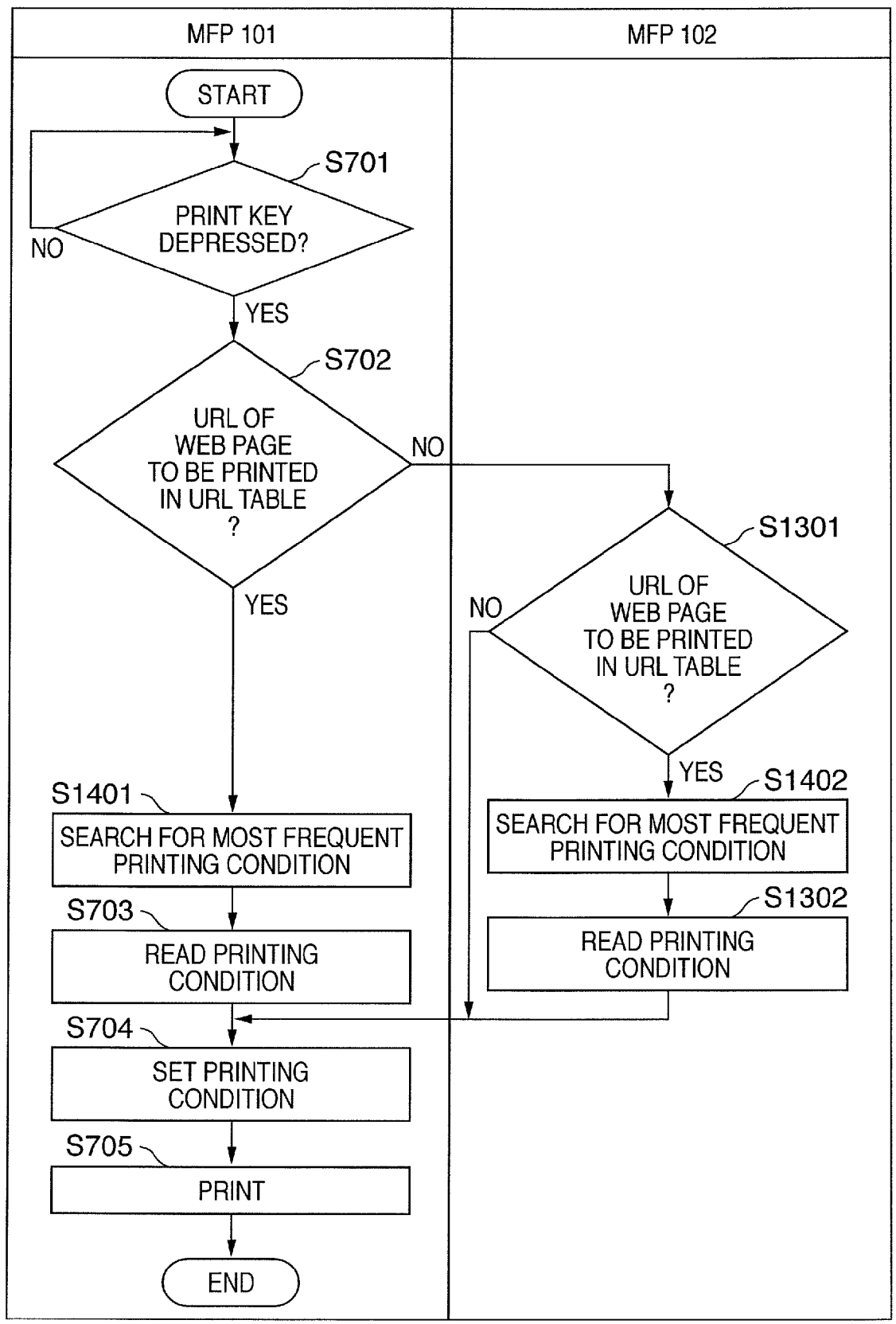
FIG. 14 shows the printing flow when a plurality of printing conditions are registered per URL as a URL table of the MFP 101 and MFP 102.

FIG. 14 shows the printing flow when a plurality of printing conditions are registered per URL as the URL tables of the MFP 101 and MFP 102 (see FIG. 11). Note that the same reference numbers are appended to portions that are common to the flowchart (FIG. 13) shown in the third embodiment.

The difference between the left columns of FIGS. 14 and 13 is the inclusion of a most frequent printing condition search process at step S1401. With the flowchart in the left column of FIG. 13, if it is determined in step S702 that the URL of the web page to be printed exists in the URL table, the printing condition registered in the URL table is read (step S703). In contrast, with the MFP 101 according to the present embodiment, there may exist a plurality of corresponding printing conditions.

In view of this, the most frequently used of the plurality of registered printing conditions to date is extracted in the most frequent printing condition search process (step S1401). As a result, the printing condition extracted in the most frequent printing condition search (step S1401) is read at step S703.

Similarly, the difference between the right columns of FIGS. 14 and 13 is the inclusion of a most frequent printing condition search process at step S1402. With the flowchart in the right column of FIG. 13, if it is determined that the URL of the web page to be printed by the MFP 101 exists in a URL table in the HDD of the MFP 102, the registered printing condition is read (step S1302). In contrast, with the MFP 102 according to the present embodiment, there may exist a plurality of corresponding printing conditions.

In view of this, the most frequently used of the plurality of registered printing conditions to date is extracted in the most frequent printing condition search process (step S1402). As a result, the printing condition extracted in the most frequent printing condition search (step S1402) is read at step S1302.

The most frequent printing condition search process (S1401, S1402) will be described in detail using the URL table of FIG. 11. If the URL of the web page to be printed is assumed to be "http://www.XXX.co.jp/aaa/aaa1.html", there exist three corresponding printing conditions. Of these, printing has previously been performed five times using the printing condition "Double-Sided(2-in-1)+Staple(Top Right)". Printing has previously been performed three times using the printing condition "Double-Sided(4-in-1)+Staple(Top Right)". And printing has previously been performed two times using the printing condition "Double-Sided(2-in-1)+ Staple(Two Right)".

Consequently, given that printing has previously been most frequently performed using the printing condition "Double-Sided(2-in-1)+Staple(Top Right)", this printing condition is extracted in the most frequent printing condition search process.

Note that with the flowchart in the right column of FIG. 13, the MFP 102 performs printing based the printing conditions read in step S1302. In contrast, with the flowchart in the right column of FIG. 14, the MFP 102 transmits the printing condition read in step S1302 to the MFP 101. Consequently, the MFP 101 performs the printing condition setting based on the printing condition transmitted from the MFP 102 (step S704).

Note that in step S1402, a plurality of printing condition with high use frequency may be extracted and displayed in the display area 611 of the LCD display unit 401, rather than extracting the printing condition with highest use frequency. One of the plurality of displayed printing conditions selected by the user may then be set as the printing condition of the web page currently being displayed.

As is evident from the above description, the MFP according to the present embodiment refers to a pre-registered URL table when printing a web page displayed by the web browser function. In the case of a plurality of printing conditions being registered, a single printing condition is read based on use frequency.

User-friendliness is thereby improved, since the user is saved the trouble of selecting one of the printing conditions, even when a plurality of printing conditions are registered in the URL table of the apparatus. Also, even if a printing condition corresponding to the desired URL is not registered in the URL table stored in the HDD of the apparatus, the user does not need to go through the process of setting the printing condition from the beginning, because the apparatus refers to the URL table of another apparatus. User-friendliness is thus further enhanced.

Further, even if a plurality of printing conditions are registered in the URL table of the other apparatus, a single printing condition is extracted based on use frequency. Thus, the user is saved the trouble of selecting one of the plurality of printing conditions, and user-friendliness is similarly improved for the user of the other apparatus.

Fifth Embodiment

In the above embodiments, the URL table of the apparatus is firstly searched if the Print key 606 is depressed, although the invention is not limited to this. Printing conditions instructed for registration in devices connected to the LAN 106 may be collectively stored as a URL table in the database/mail server 104, for example. Then, if the Print key 606 is depressed, the URL table stored in the database/mail server 104 may be searched.

Figure 15:
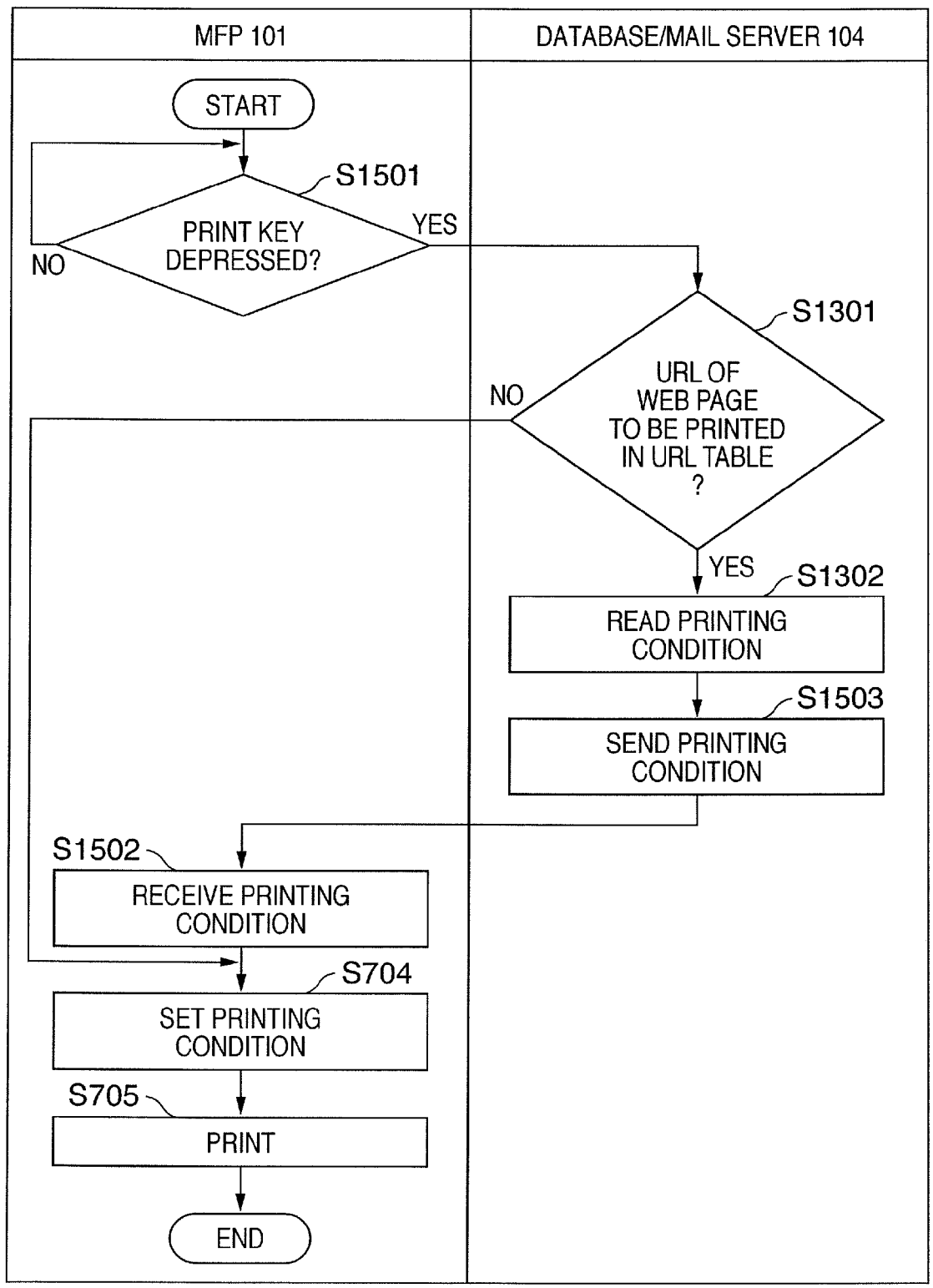
FIG. 15 is a flowchart showing the processing flow when printing is performed by the MFP 101 and a database/mail server 104, when the URL table is stored in the database/mail server 104.

FIG. 15 is a flowchart showing the processing flow when printing is performed by the MFP 101 and the database/mail server 104, when the URL table is stored in the database/mail server 104.

In step S1501, it is determined whether the Print key 606 has been depressed. If it is determined in step S1501 that the Print key 606 has been depressed, an inquiry is made as to whether the URL of the web page to be printed exists in the URL table of the database/mail server 104.

The database/mail server 104 then determines whether the URL of the web page to be printed by the MFP 101 exists (step S1301) If it is determined that the URL of the web page to be printed by the MFP 101 does not exist in the URL table of the database/mail server 104, a notification to this effect is sent to the MFP 101. In this case, the MFP 101 displays the print setting window for when a printing condition has not been set in the display area 611.

On the other hand, if it is determined in step S1301 that the URL of the web page to be printed by the MFP 101 does exist in the URL table of the database/mail server 104, processing proceeds to step S1302. At step S1302, the printing condition registered in the URL table is read.

At step S1503, the printing condition read at step S1302 is transmitted to the MFP 101. The MFP 101 receives the printing condition in step S1502, and performs the printing condition setting based on the received printing condition at step S704.

As is evident from the above description, the MFP according to the present embodiment sets a printing condition with reference to a URL table pre-registered in a server, when printing a web page displayed by the web browser function. User-friendliness is thus improved since the user is saved the trouble of setting the printing condition. Further, all of the printing conditions instructed for registration in devices connected to the server are registered in the URL table in the server. There is thus a good chance that the URL of the web page to be printed will be retrieved from the URL table. Thus, user-friendliness is further improved, since the frequency with which the user has to set the printing condition is reduced.

Other Embodiments

Apart from being registered for web pages such as "http://www.XXX.co.jp/aaa/aaa1.html", printing conditions in the above embodiments may be registered for websites, such as "http://www.XXX.co.jp" in the area 801 for storing URLs in the URL table. In this case, the same print settings can be applied to all objects stored in directories below "http://www.XXX.co.jp". Further, printing conditions may be registered by designating a specific directory in a website such as "http://www.XXX.co.jp/aaa/". In this case, the same print settings can be applied to all objects stored in directories below "http://www.XXX.co.jp/aaa/". This designation method enables printing conditions to be collectively set for web pages on the same website.

A printing condition for the web page "http://www.XXX.co.jp/aaa/aaa1.html" can, for example, also be registered in the URL table separately to a printing condition for the website "http://www.XXX.co.jp/" that includes the above web page. In this case, if the web page "http://www.XXX.co.jp/aaa/aaa1.html" of the plurality of web pages composing the website "http://www.XXX.co.jp/" is to be printed, the printing condition for this web page is applied, whereas if another web page on the same website is to be printed, the printing condition for "http://www.XXX.co.jp/" in the URL table is applied.

Further, the invention may be configured so that when registering a printing condition for a given web page (e.g., "http://www.XXX.co.jp/aaa/aaa1.html") in the URL table, an inquiry as to whether to register the printing condition as a printing condition for the web page or as a printing condition for the website ("http://www.XXX.co.jp/") that includes the web page is displayed in the LCD display unit 401 of the operation unit 293, enabling the user to choose to register either of these.

Note that the present invention can be applied to a system comprising a plurality of devices (e.g., a host computer, interface, reader, and printer) or to an apparatus (e.g., a copying machine or facsimile apparatus) comprising a single device.

Note also that the object of the present invention can also be achieved by supplying, to a system or apparatus, a storage medium recording the program code of software for implementing the functions of the embodiments described above. In this case, a computer (or a CPU or MPU) of the system or apparatus implements the above functions by reading out and executing the program code stored in the storage medium. In this case, the storage medium storing this program code constitutes the present invention.

As this storage medium for supplying the program code, it is possible to use, e.g., a floppy (registered trademark) disk, hard disk, optical disk, magnetooptical disk, CD-ROM, CD-R, magnetic tape, nonvolatile memory card, and ROM.

Also, besides the functions of the above embodiments are implemented by executing the readout program code by the computer, the present invention naturally includes a case where an OS (Operating System) or the like running on the computer performs part or the whole of actual processing on the basis of instructions by the program code, thereby implementing the functions of the embodiments.

Furthermore, the present invention of course also includes a case where the functions of the above embodiments are implemented after the program code read out from the storage medium is written in a memory of a function expansion board inserted into the computer or of a function expansion unit connected to the computer. That is, after the program code is written in the memory, a CPU or the like of the function expansion board or function expansion unit performs part or the whole of actual processing on the basis of instructions by the program code, thereby implementing the above functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-095842, filed on Mar. 30, 2006, which is hereby incorporated by reference herein in its entirety.

What is claimed is:

1. An image forming apparatus configured to print an object displayed by a browser, comprising:
   a storage unit configured to store a plurality of printing conditions associated with each of a plurality of URLs, the printing conditions being related to formatting of printed documents, wherein the storage unit further stores for each of the plurality of URLs, the plurality of printing conditions for each of the URLs and the cumulative number of times the image forming apparatus has printed using each of said plurality of printing conditions associated with each of the plurality of URLs;
   a searching unit configured to, when printing of an object displayed by the browser is instructed, search for the printing conditions based on the URL of the displayed object;
   a reading unit configured to read the printing conditions associated with the URL of the displayed object, based on a result of the search by said searching unit, wherein if the searching unit retrieves a plurality of printing conditions based on the URL of the displayed object, the reading unit reads the plurality of the printing conditions retrieved by the searching unit; and
   a display unit configured to display, when the reading unit reads the plurality of printing conditions, the URL of the displayed object, the plurality of printing conditions read by the reading unit and the cumulative number of times the image forming apparatus has printed the displayed object using each of the said plurality of printing conditions;
   a selecting unit configured to select the printing conditions specified by a user from among the plurality of printing conditions displayed by the display unit; and
   a printing unit configured to print the object based on the printing condition selected by said selecting unit.

2. The image forming apparatus according to claim 1, further comprising a setting unit configured to set, if there is not a printing condition associated with the URL of the displayed object, a printing condition of the object instructed by a user, based on a result of the search by said searching unit,
   wherein said storage unit newly stores the printing condition set by said setting unit in association with the URL of the displayed object.

3. The image forming apparatus according to claim 1, wherein said storage unit to be searched by said searching unit includes storage unit in another image forming apparatus communicably connected to the image forming apparatus.

4. The image forming apparatus according to claim 1, wherein said reading unit is capable of reading a printing condition stored in association with the URL of the displayed object in said storage unit as a printing condition of another object stored by a server apparatus that stores the object in association with the printing condition.

5. An information processing method in an image forming apparatus configured to print an object displayed by a browser, comprising the steps of:
   storing a plurality of printing conditions associated with each of a plurality of URLs, the printing conditions being related to formatting of printed documents, wherein the cumulative number of times the image forming apparatus has printed using each of the said plurality of URLs, the plurality of printing conditions for each of the URLs and associated with each of the plurality of URLs are stored for each of the plurality of printing conditions;
   searching, when printing of an object displayed by the browser is instructed, for the printing conditions based on URL of the displayed object;
   reading the printing conditions associated with the URL of the displayed object, based on a result of the search in the searching step, wherein if a plurality of printing conditions are retrieved based on the URL of the displayed object, the plurality of printing conditions retrieved in the searching step are read in the reading step;
   displaying, when the plurality of printing conditions are read in the reading step, the URL of the displayed object, the plurality of printing conditions read in the reading step and the cumulative number of times the image forming apparatus has printed the displayed object using each of the said plurality of printing conditions;
   selecting the printing conditions specified by a user from among the plurality of printing conditions displayed in the displaying step; and
   printing the object based on the printing condition selected in the selecting step.

6. A non-transitory computer-readable storage medium storing a control program for causing an image forming apparatus configured to print an object displayed by a browser to execute an information processing method that includes the steps of:
   storing a plurality of printing conditions associated with each of a plurality of URLs, the printing conditions being related to formatting of printed documents, wherein the cumulative number of times the image forming apparatus has printed using each of the said plurality of URLs, the plurality of printing conditions for each of the URLs and associated with each of the plurality of URLs are stored for each of the plurality of printing conditions;

searching, when printing of an object displayed by the browser is instructed, for the printing conditions based on URL of the displayed object;

reading the printing conditions associated with the URL of the displayed object, based on a result of the search in the searching step, wherein if a plurality of printing conditions are retrieved based on the URL of the displayed object, the plurality of printing conditions retrieved in the searching step are read in the reading step;

displaying, when the plurality of printing conditions are read in the reading step, the URL of the displayed object, the plurality of printing conditions read in the reading step and the cumulative number of times the image forming apparatus has printed the displayed object using each of the said plurality of printing conditions;

selecting the printing conditions specified by a user from among the plurality of printing conditions displayed in the displaying step; and printing the object based on the printing condition selected in the selecting step.

* * * * *